(12) United States Patent
Hoffmann et al.

(10) Patent No.: US 8,022,170 B2
(45) Date of Patent: Sep. 20, 2011

(54) COPOLYAMIDES

(75) Inventors: Botho Hoffmann, Domat/Ems (CH); Heinz Hoff, Tamins (CH); Hanns-Jörg Liedloff, Domat/Ems (CH); Ralph Kettl, Paspels (CH)

(73) Assignee: EMS-Chemie AG, Domat/Ems (CH)

( * ) Notice: Subject to any disclaimer, the term of this patent is extended or adjusted under 35 U.S.C. 154(b) by 1104 days.

(21) Appl. No.: 10/536,494

(22) PCT Filed: Dec. 17, 2003

(86) PCT No.: PCT/EP03/14364
§ 371 (c)(1),
(2), (4) Date: Oct. 5, 2006

(87) PCT Pub. No.: WO2004/055084
PCT Pub. Date: Jul. 1, 2004

(65) Prior Publication Data
US 2006/0235190 A1    Oct. 19, 2006

(30) Foreign Application Priority Data
Dec. 17, 2002   (DE) .................................. 102 59 048

(51) Int. Cl.
*C08G 69/08*   (2006.01)
(52) U.S. Cl. ..................... 528/310; 525/420; 525/420.5; 525/432
(58) Field of Classification Search .................. 528/339, 528/310; 525/420, 420.5, 432
See application file for complete search history.

(56) References Cited

U.S. PATENT DOCUMENTS

| | | | |
|---|---|---|---|
| 4,212,777 | A | 7/1980 | Goletto |
| 4,603,166 | A | 7/1986 | Poppe et al. |
| 4,680,379 | A * | 7/1987 | Coquard et al. ............... 528/336 |
| 4,826,951 | A * | 5/1989 | Coquard et al. ............ 528/339.3 |
| 4,831,108 | A | 5/1989 | Richardson et al. |
| 5,081,222 | A | 1/1992 | Reimann et al. |
| 5,098,940 | A | 3/1992 | Brooks |
| 5,177,178 | A | 1/1993 | Thullen et al. |
| 5,191,060 | A | 3/1993 | Akkapeddi et al. |
| RE34,447 | E | 11/1993 | Poppe et al. |
| 5,302,691 | A | 4/1994 | Soelch |
| 5,708,125 | A | 1/1998 | Liedloff et al. |
| 5,786,086 | A * | 7/1998 | Frihart et al. ................. 428/379 |
| 6,291,633 | B1 * | 9/2001 | Nakamura ..................... 528/310 |
| 2003/0126788 | A1 * | 7/2003 | Uang et al. ...................... 44/275 |

FOREIGN PATENT DOCUMENTS

| | | |
|---|---|---|
| CA | 861620 | 1/1971 |
| CH | 280367 | 1/1952 |
| DE | 43 29 676 C2 | 3/1994 |
| DE | 195 37 614 C2 | 4/1997 |
| EP | 0 196 981 A1 | 10/1986 |
| EP | 0 360 611 B1 | 3/1990 |
| EP | 0 449 466 A1 | 10/1991 |
| EP | 0 469 435 B1 | 2/1992 |
| EP | 0 508 054 A2 | 10/1992 |
| EP | 0 550 314 B1 | 7/1993 |
| EP | 0 550 315 B1 | 7/1993 |
| EP | 0 659 534 B1 | 6/1995 |
| EP | 0 693 515 B1 | 1/1996 |
| EP | 0 818 491 B1 | 1/1998 |
| GB | 766927 | 1/1957 |
| JP | 54-071191 A | 6/1979 |
| JP | 63-023927 A | 2/1988 |
| JP | 06-120125 A | 9/1988 |
| JP | 05-125184 * | 5/1993 |
| JP | 06-511281 T | 12/1994 |
| JP | 09-078351 A | 3/1997 |
| JP | 10-168183 A | 6/1998 |
| WO | WO 90/02017 A1 | 3/1990 |
| WO | WO 92/01389 A1 | 2/1992 |
| WO | WO 92/10525 A1 | 6/1992 |
| WO | WO 95/01389 A1 | 1/1995 |

OTHER PUBLICATIONS

Cramer et al., *Journal of Polymer Science*, 21, 237-250 (1956).
Dolden, *Polymer*, 17, 875-892 (1976).
Edgar et al., *Journal of Polymer Science*, 8 (1), 1-22 (1952).
Henkel Corporation, "Empol Dimer and Polybasic Acids: Technical Bulletin 114C," (1997).
Levine el al., *Journal of Polymer Science, XLIX*, 241-246 (1961).
Unichema International, "Pripol C36-Dimer Acid."
Yu et al., *Am. Chem. Soc.*, 81, 5361-5365 (1959).

* cited by examiner

*Primary Examiner* — James J Seidleck
*Assistant Examiner* — Gregory Listvoyb
(74) *Attorney, Agent, or Firm* — Leydig, Voit & Mayer, Ltd.

(57) ABSTRACT

The invention relates to semi crystalline, melt processible, partially aromatic copolyamides, producible by condensation of at least the following monomers or the precondensates thereof:
a) terephthalic acid
b) at least one dimerised fatty acid with up to 44 carbon atoms and
c) at least one aliphatic diamine of the formula $H_2N-(CH_2)_x-NH_2$, wherein x means a whole number from 4-18.

18 Claims, No Drawings

COPOLYAMIDES

This application is the U.S. national phase of international patent application PCT/EP03/014364, filed on Dec. 17, 2003, and claims priority to German patent application number 102 59 048.6, filed Dec. 17, 2002, all of which are hereby incorporated by reference.

The present invention relates to semi crystalline, melt processible, partially aromatic copolyamides which, in addition to terephthalic acid and at least one aliphatic diamine $H_2N$—$(CH_2)_x$—$NH_2$ with x=4-18, also contain at least one dimerised fatty acid with up to 44 carbon atoms and if necessary further aromatic dicarboxylic acids, aliphatic dicarboxylic acids and lactams or ω-aminocarboxylic acids and which, due to this selection of components, are endowed with increased toughness relative to comparable partially aromatic copolyamides.

Semi crystalline, partially aromatic copolyamides with hexamethylene terephthalamide units in addition to other amide units were introduced on the market approximately twelve years ago and since then have been part of engineering thermoplastics. Thanks to their high melting points of up to approx. 330° C., these products in the form of their glass fibre-reinforced compounds are distinguished by very high thermostability (HDT=Heat Distortion Temperature). In addition, these products are also resistant to many aggressive chemicals, even at comparatively high temperatures, which makes them, together with their high HDT values, suitable for applications which can no longer be realized with conventional polyamides, e.g. PA6 or PA66.

These products, for which in the meantime the generally accepted description "polyphthalamides" has been established, are described in detail—sometimes also the production methods—in numerous printed patent specifications, for example in U.S. Pat. No. 4,603,166, U.S. Pat. No. 4,831,108, U.S. Pat. No. 5,098,940, U.S. Pat. No. 5,302,691, WO 90/02017, WO 92/10525, WO 95/01389, EP 0 360 611 B1, EP 0 449 466 B1, EP 0 550 314 B1, EP 0 550 315 B1, EP 0 693 515 B1 and DE 43 29 676 C1.

The overall excellent properties of the polyphthalamides should however not conceal the fact that there is a significant requirement for improvement in the case of some of their properties. In particular the toughness of these products, expressed by their impact strength and notched impact strength, and often also their elongation at break, does not fulfil all requirements.

It is therefore the object of the present invention to provide novel semi crystalline, melt processible, partially aromatic copolyamides with increased toughness. As a second object of the invention, the polymer structure of these products is intended thereby to be modified such that no change is necessary in the production method, i.e. the partially aromatic copolyamides according to the invention can be produced according to the known methods of the state of the art.

This object preferably is achieved by the characterizing features of the present invention. Advantageous embodiments and further developments of the solution will be apparent from the description of the invention provided herein.

This object is achieved with copolyamides which have been obtained from specific selected monomers or precondensates thereof. In addition to terephthalic acid (component a), at least one dimerised fatty acid b) with up to 44 carbon atoms is used and at least one aliphatic diamine of the formula $H_2N$—$(CH_2)_x$—$NH_2$ (component c), wherein x means a whole number from 4-18. If necessary, further monomers d), e) and f) (claims 2 to 5) are used. The obtained copolymer preferably has a melting point of at most 335° C., measured by means of DSC.

The above-described monomers, educts a)-c) if necessary with d)-f), are thereby used in such molar ratios which lead to end products which are semi crystalline and have a melting point by means of DSC which is at most 335° C.

The individual monomers are described in more detail subsequently.

The dimerised fatty acids b) are obtained from monomer unsaturated fatty acids with preferably 18 carbon atoms by a specific oligomerisation reaction. As a result of this reaction, smaller quantities of the trimerised fatty acid are produced in addition to an unsaturated dimerised one. By subsequent catalytic hydration, the C—C double bonds can be removed. The term "dimerised fatty acid", as it is used here, relates to both types of these dicarboxylic acids, saturated and unsaturated. Details relating to the structure and the properties of the dimerised fatty acids are found in the corresponding leaflet "Pripol $C_{36}$-Dimer acid" of the Company UNICHEMA (Emmerich, D) or in the brochure of the Company COGNIS (Düsseldorf, D) "Empol Dimer and Poly-basic Acids; *Technical Bulletin* 114C (1997)". In order to produce polyamides, dimerised fatty acids with a content of trimerised fatty acid of at most 3% by weight are used. There are a lot of polyamides of this type which generally melt at a very low temperature or have absolutely no melting point, are highly flexible to rubber-like and are used to produce flexible products, such as binders, shoe adhesive and adhesive films. In CA 861 620, products of this type are described for example. Only a few partially aromatic copolyamides modified with dimerised fatty acids are known, which have high rigidity and strength. Products of this type are described for example in U.S. Pat. No. 5,177,178, this however concerning amorphous copolyamides which, in addition to a dimerised fatty acid, contain an aromatic dicarboxylic acid and at least one cycloaliphatic diamine. The function of the dimerised fatty acid is here reducing the water absorption of these amorphous copolyamides and of limiting the reduction in the glass transition temperature associated with the water absorption (see column 2, lines 18-23 and 48-54). It is asserted in column 4, lines 4-5 that the amorphous copolyamides were distinguished by high impact strength (" . . . high . . . impact resistance."). In fact, examination of the impact strength and notched impact strength (measuring methods: see below) of the product according to example 1 just produced values of 27 and 0.5 kJ/m², which is similar to a pronounced brittle breaking behaviour and does not at all fulfil the lowest requirements. EP 0 469 435 B1 likewise claims amorphous copolyamides which contain dimerised fatty acids, which copolyamides differ from the products of U.S. Pat. No. 5,177,178 in the structure of the cycloaliphatic diamine which is used. In impact strength and notched impact strength, the behaviour here is not very different from U.S. Pat. No. 5,177,178. The notched impact strengths of the copolyamides of example 3 and 4 are indicated by 0.7 and 0.6 kJ/m², the impact strength of example 4 by 35.3 kJ/m². Finally, U.S. Pat. No. 5,177,178 and EP 0 469 435 B1 say nothing about the possible effects of dimerised fatty acids as a component of semi crystalline, partially aromatic copolyamides. The latter is also true for U.S. Pat. No. 5,708,125 which in fact accepts dimerised fatty acids as co-components of precondensates of amorphous or semi crystalline, partially aromatic copolyamides but contains neither such examples nor any details about the properties of possible polymer end products.

Component c) concerns aliphatic diamines of the formula $H_2N$—$(CH_2)_x$—$NH_2$, wherein x means a whole number from 4-18. Preferably, the copolyamides according to the invention contain hexamethylene diamine, 1,9-diaminononane, 1,10-diaminodecane or 1,12-diaminododecane.

If necessary, the copolyamides according to the invention can contain a further aromatic dicarboxylic acid d), an aliphatic dicarboxylic acid e) and a lactam or a ω-aminocarboxylic acid f) with 6-12 carbon atoms, there being preferred isophthalic acid for d), adipic acid for e) and laurinlactam or ω-aminolauric acid for f).

The melting point of the copolyamides according to the invention is at most 335° C. and, for the copolyamides in some embodiments according to the invention, it is at least a temperature of at least 255° C., at least 265° C., at least 270° C., or at least 290° C.

The present invention relates to partly aromatic copolyamides which are not however semi crystalline over their entire composition range and consequently do not always have a melting point. It is therefore appropriate to indicate criteria which make it possible to differentiate between semi crystalline and amorphous copolyamides and in addition to indicate the melting point of the semi crystalline products. In the case of amorphous polyamides, e.g. the article "Structure Property Relationship in Amorphous Polyamides" by J. G. Dolden, which appeared in Polymer 1976, Vol. 17, pages 875 to 892, offers valuable assistance in this respect. The prediction of semi crystallinity of partially aromatic copolyamides is definitely possible at least for the group of so-called isomorphous copolyamides. Examples of systems of this type are PA-66/6T, PA-46/4T, PA-106/10T and PA-68/6PBDA based on hexamethylene diamine (HMD)/adipic acid (ADA)/terephthalic acid (TPA) or tetramethylene diamine/ADA/TPA or decamethylene diamine/ADA/TPA and HMD/suberic acid/p-benzene diacetic acid (PBDA). More detailed information in this respect can be found in numerous publications, e.g. in H. Plimmer et al. in the Brit. Pat. Appl. 604/49, Imperial Chemical Industries Ltd. (1949); R. Gabler, CH-A-280 367, Inventa AG (1949); M. Levin and S. C. Temin, J. Polym. Sci. 49, 241-249 (1961); T. Sakashita et al. in U.S. Pat. No. 4,607,073, Mitsui Petrochemical Industries Ltd. (1985); S. Yamamoto and T. Tataka, EP 0 449 466 B1, Mitsui Petrochemical Industries and also in Brit. Pat. Appl. 766 927, California Research Corporation (1954). Information regarding non-isomorphous copolyamides, which can have amorphous structures in specific ranges of their composition, are found in some of the above publications and in A. J. Yu and R. D. Evans, J. Am. Chem. Soc., 20 5261-5365 (1959) and also F. B. Cramer and R. G. Beamann, J. Polym. Sci., 21, 237-250 (1956).

If on the basis of the above-cited publications and further works cited therein no conclusive answer is possible as to whether a given copolyamide is semi crystalline or amorphous or which melting point it has, then a pre-test for producing the relevant product in a small laboratory autoclave is of further assistance. For this purpose, the respective components are mixed together with water and heated in the closed autoclave after purging with an inert gas. After reaching 200 to 230° C. product temperature, water vapour is withdrawn by opening the gas discharge valve and the pressure is reduced to ambient pressure with further heating to 250 to 290° C. However, it must thereby be taken into account that, in the course of this procedure, higher melting copolyamides in specific operational states can crystallise spontaneously and can jam the agitator. The relevant product is removed from the autoclave and examined with respect to its melting point by means of differential scanning calorimetry (DSC). The DSC measurement is repeated expediently once to twice on one and the same sample in order to ensure a defined thermal previous history of the respective copolyamide. In the simplest case, instead of an autoclave, also a stirable vessel which can be made inert and is operated without pressure, e.g. a glass flask, can be used to implement the pre-test. The temperature at the end of the reaction should thereby be likewise between 250 to 290° C.

The above-mentioned publications in fact relate only to products without dimerised fatty acids but nevertheless quite precise predictions can be made from their melting points regarding the melting behaviour of the corresponding copolyamides which contain up to approx. 30% by weight of dimerised fatty acids.

It has in fact been shown that dimerised fatty acids in partly aromatic copolyamides produce a surprisingly low depression of the melting point and only slightly impair the crystallisation behaviour. Hence, a means was provided with the dimerised fatty acids with which not only the toughness of semi crystalline, partially aromatic copolyamides is increased, but also their melting- and crystallisation behaviour (solidification temperature and solidification speed at a given cooling rate) is extensively retained.

In this particularly favourable property combination, the copolyamides according to the invention are significantly superior to the copolyamides based on terephthalic acid, hexamethylene diamine and laurinlactam described in EP 0 550 314 B1 and EP 0 550 315 B1. In order that these PA-6T/12 formulations can be made sufficiently tough, they must contain at least 55% by mol PA-12 units. At this composition, the melting point is however only 245° C. and the solidification speed is comparatively low.

In order to control their molecular weight, the copolyamides according to the invention can of course contain small quantities of aliphatic, cycloaliphatic or aromatic monocarboxylic acids and/or monoamines which are added to the components before or during polycondensation. Their production takes place according to known methods, as are described for example in U.S. Pat. No. 4,831,108, U.S. Pat. No. 5,098,940, U.S. Pat. No. 5,708,125, EP 0 550 315 B1 or DE 4,329,676 C1.

Furthermore, it is possible to further modify the copolyamides according to the invention in different ways according to their respective use. Thus, in the case of copolyamides which are converted by melt processing methods, such as injection moulding, injection moulding welding, extrusion, coextrusion, blow moulding, deep drawing and comparable processing methods to form corresponding objects, the addition of reinforcing agents and fillers, such as glass fibres, carbon fibres, minerals (inter alia layered silicates) and other modifying agents, for example heat stabilisers, UV stabilisers, antistatic agents, flame retardants, lubricants or mould release agents, is current practice. With respect to the mentioned melt processing methods, also the following variants should be mentioned: production of hard-soft combinations, e.g. by injection moulding or extrusion, sequential coextrusion (e.g. according to EP 0 659 534 B1), sequential extrusion blow moulding (e.g. according to EP 0 659 535 B1), 3D blow moulding, coextrusion blow moulding, coextrusion 3D blow moulding, coextrusion suction blow moulding, injection moulding with internal gas pressure technology (GIT) and internal water pressure technology (WIT). In the case of heat and WV stabilisation, one can fall back on the methods and additives inter alia as are described in DE 195 37 614 C2 or EP 0 818 491 B2. The copolyamides according to the invention can furthermore be mixed with other polymers, e.g. other semi aromatic or aliphatic polyamides, e.g. PA12 or PA66 or with polyolefins which are provided with polar or reactive groups, such as e.g. carboxyl groups, anhydride groups, imide groups or glycidyl(meth)acrylate groups. These functionalised polyolefins concern in particular copolymers with (i) a monomer of ethylene or α-olefin or if necessary a diolefin and (ii) at least one comonomer which is selected from vinyl esters, saturated carboxylic acids, unsaturated mono- and dicarboxylic acids, the esters and salts thereof, and also dicarboxylic acid anhydrides (preferably maleic anhydride). The functionalised polyolefins act inter alia as viscosity modifiers. The starting point for functionalised polyolefins is e.g. polyethylenes (HDPE, LDPE, LLDPE), ethylene/propylene-, ethylene/1-butene copolymers, EPM, EPDM, SBS, SIS and SEBS.

The production of the copolyamides according to the invention is possible by known methods. Reference is made by way of representation to U.S. Pat. No. 5,708,125 and U.S. Pat. No. 4,831,108.

Furthermore, the invention relates to moulded parts produced from or with copolyamides as described above. It has proved to be particularly suitable to use the copolyamides for hard-soft combinations.

EXAMPLES

The following examples explain the invention. All the products were produced according to a multi-stage method. The precondensate production was implemented according to the method described in U.S. Pat. No. 5,708,125, the postcondensation in the melt corresponded inter alia to the method described in U.S. Pat. No. 4,831,108.

In the first step, an aqueous solution of the components with 20-30% by weight of water is produced firstly at 190° C. in an agitated pressure vessel (V=20 l) which can be made inert with nitrogen. Agitation takes place for two hours at this temperature until a pressure of approx. 1.0 MPa has been set. After completion of this step, the solution is withdrawn from the receiving vessel under pressure into a 20 l agitated autoclave and heated there to 260° C., the pressure being maintained at 3.3 MPa by means of repeated opening of a gas discharge valve. As soon as the pressure remains constant after approximately 2 hours—even without further actuation of the valve—the base valve is opened and the precondensate solution is withdrawn and sprayed into a cyclone. A large part of the water thereby evaporates and irregularly formed particles of the relevant precondensate are obtained, which are dried in a vacuum at 80° C. and subsequently ground into a powder.

In order to produce high molecular copolyamides, the precondensates are postcondensed in the melt in a parallel twin-screw extruder of the ZSK 25 type (product of the company Werner & Pfleiderer; Stuttgart, D) under the following conditions. The highly viscose polymer melt is withdrawn as a strand, cooled and granulated precondensate dosage and throughput: 4 kg/h
screw speed of rotation: 100 rpm
temperatures (zone 1-12):
30/40/100/300/350/370/370/370/370/370/360/330 and 330° C.
degassing: zone 10 under $N_2$
drying of the granulate: 24 hours at 100° C. in a vacuum.

The solution viscosity of precondensate and finished copolyamide was determined in 0.5% by weight solution in m-cresol at 20° C. The determination of the end group concentrations was effected by means of acidimetric titration. The amino end groups were titrated in m-cresol/isopropanol 2:1 (weight-parts) as solvent with 0.1 normal ethanolic perchloric acid. The titration of the carboxyl end groups was effected in an orthocresol/benzyl alcohol mixture as solvent with 0.1 normal tert-butylammonium hydroxide.

The DSC measurements were implemented with the appliance of the company TA Instruments, Universal Type V2.3C.

In order to measure the Young's modulus and the elongation at break, tension tests were implemented according to ISO 527 on injection moulded tension bars. The measurement of impact strength or notched impact strength was implemented according to ISO 179/2-1 eU or ISO 179/2-1 eA on injection moulded test bars.

The abbreviations used in the examples have the following meaning:

| | |
|---|---|
| TPA | terephthalic acid |
| HMD | hexamethylene diamine |
| P1012 | Pripol 1012 (= $C_{36}$ dimer acid) |
| IPA | isophthalic acid |
| ADA | adipic acid |
| ALA | ω-aminolauric acid |
| NHP | sodium hypophosphite ($NaH_2PO_2$) |
| DW | Deionised water |
| RV | relative solution viscosity in 0.5% solution in m-cresol at 20° C. |
| [C] | carboxyl end group concentration in meq/kg |
| [A] | amino end group concentration in meq/kg |
| MP | DSC melting point (° C.) |
| IS | impact strength at 23° C. in $kJ/m^2$ |
| NIS | notched impact strength at 23° C. in $kJ/m^2$ |
| YM | Young's modulus |
| EB | Elongation at break in % |

TABLE 1

| | Formulations | | | | | | | |
|---|---|---|---|---|---|---|---|---|
| Example | TPA [% by wt.] | HMD [% by wt.] | P1012 [% by wt.] | IPA [% by wt.] | ADA [% by wt.] | ALA [% by wt.] | NHP [% by wt.] | DW [% by wt.] |
| Comp. 1a) | 28.60 | 29.15 | | 12.25 | | | 0.02 | 29.99 |
| Comp. 2b) | 23.10 | 30.23 | | | 16.62 | | 0.02 | 30.03 |
| Comp. 3c) | 20.36 | 14.66 | | | | 34.95 | 0.02 | 30.00 |
| 1 | 23.77 | 26.09 | 12.41 | 9.14 | | | 0.02 | 28.57 |
| 2 | 21.03 | 28.59 | 6.80 | | 14.99 | | 0.02 | 28.57 |
| 3 | 21.10 | 19.00 | 18.15 | | | 11.71 | 0.02 | 30.01 | a) according to EP 0 360 611 B1 (MITSUI)
b) according to EP 0 449 466 B1 (MITSUI)
c) according to EP 0 550 314 B1 (ELF ATOCHEM S.A.)

TABLE 2

Relative viscosities, end groups and DSC melting points

| Example | Precondensate | | | Copolyamide | |
|---|---|---|---|---|---|
| | RV | [A] | [C] | RV | MP |
| Comp. 1 | 1.137 | — | — | 1.91 | 330 |
| Comp. 2 | 1.125 | — | — | 1.93 | 315 |
| Comp. 3 | 1.122 | 1410 | 1247 | 1.87 | 248 |
| 1 | 1.107 | 1588 | 1378 | 1.82 | 323 |
| 2 | 1.141 | 1184 | 1010 | 1.98 | 305 |
| 3 | 1.119 | 1470 | 1297 | 1.84 | 294 |

TABLE 3

Mechanical properties of the copolyamides in the dry state

| Example | IS | NIS | YM | EB |
|---|---|---|---|---|
| Comp. 1 | 58 | 4 | 3900 | 2 |
| Comp. 2 | 97 | 5 | 4000 | 3 |
| Comp. 3 | 40% w.b. | 7 | 3300 | 5 |
| 1 | 60% w.b. | 10 | 3100 | 4 |
| 2 | w.b. | 10 | 3060 | 6 |
| 3 | w.b. | 12 | 2700 | 9 | w.b.: without break

The invention claimed is:

1. Semi crystalline, melt processable, partially aromatic copolyamides, producible by condensation of at least the following monomers or precondensates thereof:
    a) terephthalic acid
    b) at least one dimerised fatty acid with up to 44 carbon atoms, wherein the dimerised fatty acid has a trimerised fatty acid content of at most 3% by weight, and
    c) at least one aliphatic diamine of the formula $H_2N$—$(CH_2)_x$—$NH_2$, wherein x means a whole number from 4-18, with the proviso that when the partially aromatic copolyamide is produced by condensation of the monomers or precondensates a), b) and c) where X is 6, and further d) adipic acid, the melting point of the copolyamides is at least 265° C. as measured by Differential Scanning Calorimetry (DSC).

2. Copolyamides according to claim 1, wherein the melting point of these copolyamides, measured by means of DSC (Differential Scanning Calorimetry), is at most 335° C.

3. Copolyamides according to claim 1, wherein a further aromatic dicarboxylic acid d) with 8-12 C atoms is present.

4. Copolyamides according to claim 1, wherein in addition an aliphatic dicarboxylic acid e) with 6-18 C atoms is present.

5. Copolyamides according to claim 1, wherein in addition a lactam and/or an aminocarboxylic acid with 6-12 C atoms, preferable ω-aminolauric acid, are present as further monomers f).

6. Copolyamides according to claim 1, wherein the aromatic dicarboxylic acid d) is isophthalic acid.

7. Copolyamides according to claim 1, wherein the aliphatic dicarboxylic acid e) is adipic acid.

8. Copolyamides according to claim 1, wherein in addition to the monomers a), b) and c) wherein x=6, isophthalic acid d) is present and the melting point of these copolyamides, measured by means of DSC, is at least 290° C.

9. Copolyamides according to claim 1, wherein in addition to the monomers a), b) and c) wherein x=6, adipic acid e) is present and the melting point of these copolymers, measured by means of DSC, is at least 270° C.

10. Copolyamides according to claim 1, wherein in addition to the monomers a), b) and c) wherein x=6, isophthalic acid d) and adipic acid e) is present and the melting point of these copolyamides, measured by means of DSC, is at least 265° C.

11. Copolyamides according to claim 1, wherein in addition to the monomers a), b) and c) wherein x=6, laurinlactam (f) or ω-aminododecanoic acid (f) is present and the melting point of these copolyamides, measured by means of DSC, is at least 255° C.

12. Copolyamides according to claim 1, wherein x=9, 10 or 12.

13. Copolyamides according to claim 12, wherein in addition to the components a), b) and c), adipic acid (e) is present.

14. Method of preparing moulded articles comprising melt processing semi crystalline, melt processable, partially aromatic copolyamides, producible by condensation of at least the following monomers or precondensates thereof:
    a) terephthalic acid
    b) at least one dimerised fatty acid with up to 44 carbon atoms, wherein the dimerised fatty acid has a trimerised fatty acid content of at most 3% by weight, and
    c) at least one aliphatic diamine of the formula $H_2N$—$(CH_2)_x$—$NH_2$, wherein x means a whole number from 4-18, with the proviso that when the partially aromatic copolyamide is produced by condensation of the monomers or precondensates a), b) and c) where X is 6, and further d) adipic acid, the melting point of the copolyamides is at least 265° C. as measured by Differential Scanning Calorimetry (DSC).

15. The method of claim 14, wherein the moulded articles are hard-soft combinations.

16. The method of claim 14, wherein the melt processing method is selected from extrusion, injection moulding, coextrusion, blow moulding, deep drawing, sequential coextrusion, sequential extrusion blow moulding, 3D blow moulding, coextrusion blow moulding, coextrusion 3D blow moulding and coextrusion suction blow moulding.

17. Moulded article produced according to the method of claim 14.

18. Moulded article produced according to the method of claim 17, wherein it is a hard-soft combination.

* * * * *